United States Patent Office 2,711,100
Patented June 21, 1955

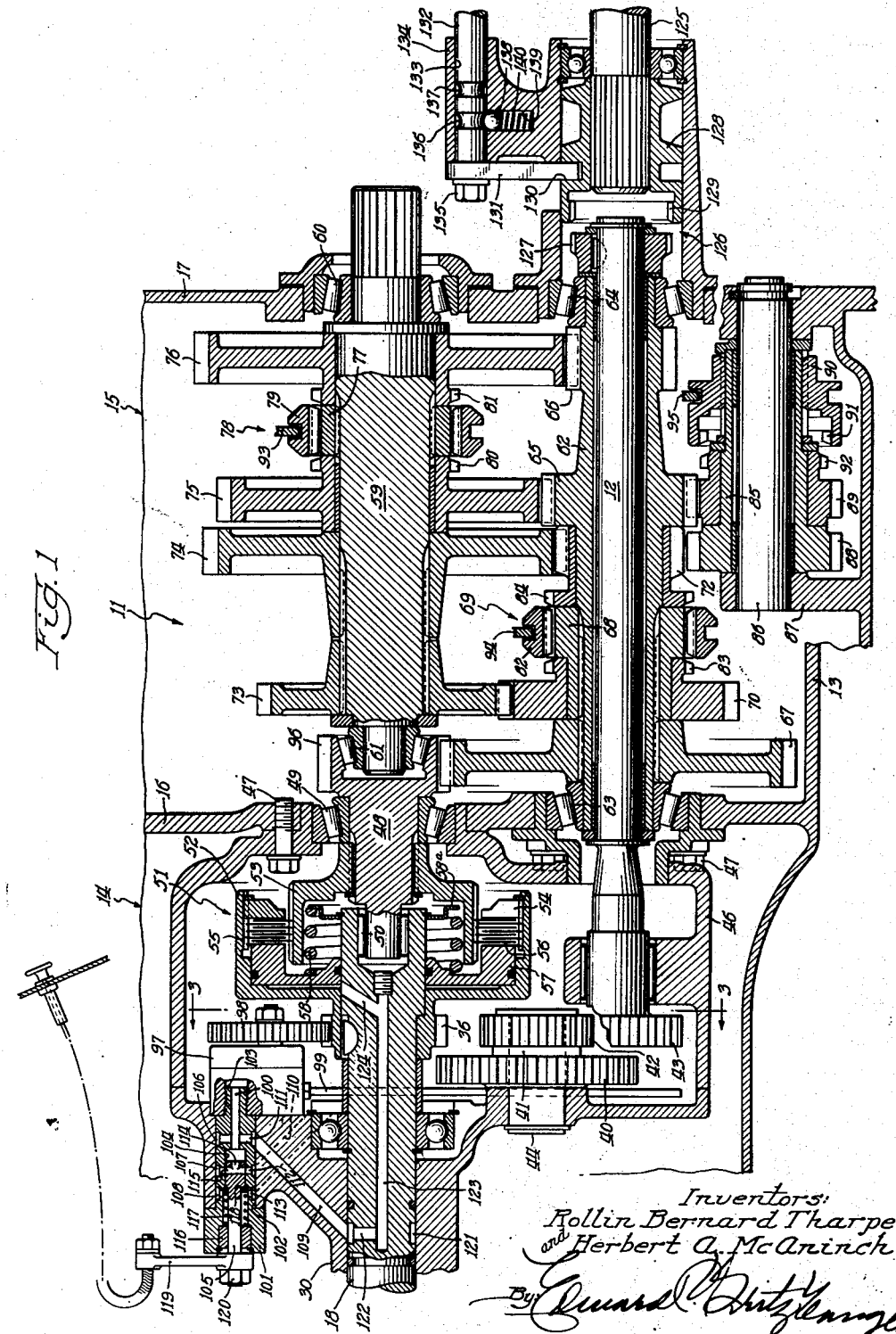

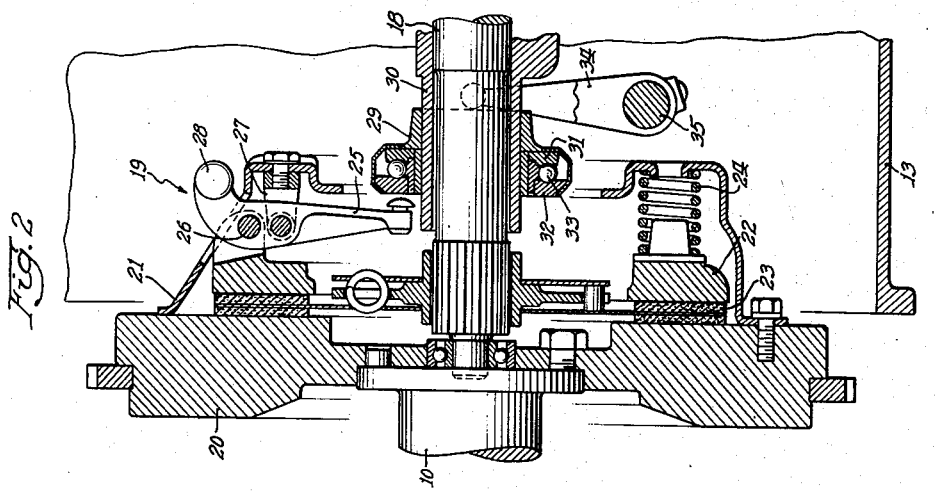
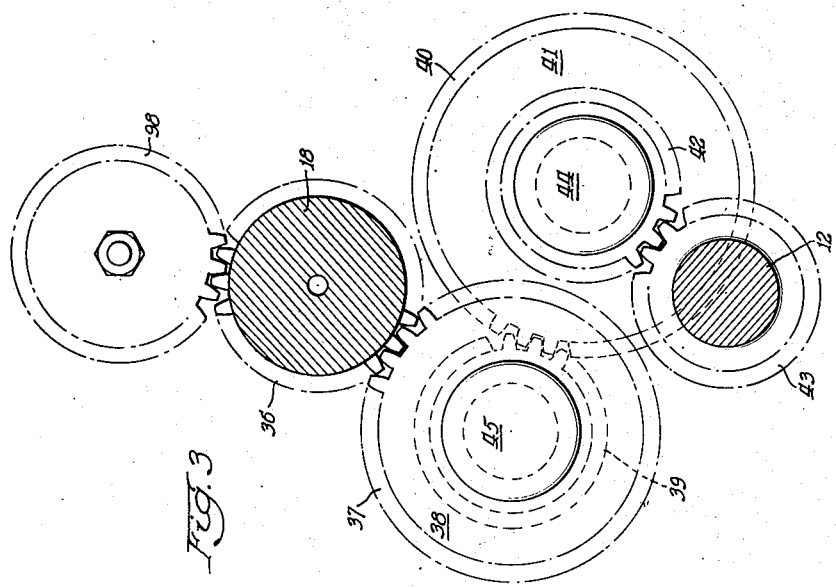

2,711,100

TRANSMISSION

Rollin Bernard Tharpe, Garrett, and Herbert A. Mc-Aninch, Auburn, Ind., assignors to Borg-Warner Corporation, Chicago, Ill., a corporation of Illinois Application April 26, 1951, Serial No. 223,036

4 Claims. (Cl. 74—15.66)

The present invention relates in general to power take-off devices and is particularly applicable to power take-off devices for farm tractors.

The principal object of the present invention is to provide a power take-off device for use with a transmission mechanism of the countershaft type wherein the power take-off shaft itself is concentrically mounted within the countershaft, thereby affording a simple and compact transmission assembly.

A further object of the invention is to provide a power take-off device in association with a transmission assembly wherein the power take-off shaft is at all times driven by a power input shaft and a clutch is provided between the input shaft and the transmission mechanism so that the power take-off shaft can be rotated independently of the transmission of power to the transmission mechanism.

Another object of the invention is to provide a fluid pressure actuated clutch between a drive shaft or power input shaft and a transmission mechanism wherein means operated by the drive shaft itself cause fluid pressure to be supplied for actuating the clutch. In connection with this object of the invention, when the engine is idling, the fluid pressure initially supplied by the drive shaft operated means is momentarily insufficient to cause engagement of the clutch, but as the speed of rotation of the drive shaft increases, the fluid pressure also increases and thereby causes engagement of the clutch and consequently transmission of power from the drive shaft to the transmission mechanism.

Another object of the invention is to provide, in combination with a fluid pressure actuated clutch and a drive shaft operated fluid pressure supply means, a valve which normally occupies a position wherein the fluid is directed to the clutch and the pressure of the fluid is regulated, the valve being manually movable to a second position to cause the fluid under pressure to be drained so as to prevent engagement of the clutch. The valve mechanism per se is disclosed in detail in the copending application of J. A. Lauck, Serial No. 212,910, filed February 27, 1951.

The above and numerous other objects and advantages of the present invention will become apparent from the following detailed description when read in conjunction with the appended drawings, wherein:

Fig. 1 is a sectional view through the transmission mechanism of the present invention;

Fig. 2 is a sectional view of the main clutch between the driving engine and the transmission, and Fig. 3 is a sectional view taken along the lines 3—3 in Fig. 1 and looking in the direction of the arrows.

With reference to the drawings, wherein like reference numerals in the different views identify identical parts, a drive shaft 10, which may be driven by the engine of the tractor or other power operated device with which the present invention is associated, supplies the rotative power for operating a countershaft type transmission mechanism 11 and a power take-off shaft 12. This mechanism is housed in a suitable casing 13 which includes front and rear sections 14 and 15, respectively, that are separated by a support plate 16. The casing 13 is also provided with a suitable transversely extending support plate 17.

The drive shaft 10 drives an intermediate shaft 18 by means of a clutch mechanism 19. The clutch mechanism 19 is of the type which is normally engaged by spring pressure and centrifugal force and which may be disengaged by a manually controlled foot operated lever. For a detailed description of the clutch mechanism 19, reference should be had to the patent to E. E. Wemp 2,038,017, and accordingly this clutch mechanism will be described only insofar as is necessary for a thorough understanding of the present invention. Drive shaft 10 is bolted to a flywheel 20 and the flywheel, in turn carries a cover plate 21. Positioned between the cover plate 21 and the flywheel 20 is a pressure plate 22 that is urged against an annular friction member 23 by means of a plurality of compression springs 24 mounted between the cover plate 21 and the pressure plate 22. As shown, the friction member 23 is splined to the intermediate shaft 18 and when it is compressed between the pressure plate 22 and the flywheel 20 rotation of the drive shaft 10 is transmitted to the intermediate shaft 18. The pressure plate 22 has a plurality of levers 25 pivotally secured thereto by means of bolts 26 and the levers 25 are also pivotally secured to corresponding lugs 27 secured to the cover plate 21. The levers 25 are formed with weights 28 which, under the action of centrifugal force during the rotation of the flywheel 20 and cover plate 21, fly outwardly and to the left to increase the force of engagement of the pressure plate 22 against the friction member 23. Means are provided for manually disengaging the clutch mechanism 19 and this means includes a longitudinally reciprocable collar 29 mounted for free reciprocation upon a sleeve member 30. The collar 29 carries an annular member 31 and a rotatable member 32 that is permitted to rotate freely by means of anti-friction bearings 33. A bifurcated manually operable control lever 34 is secured to a rotatable shaft 35, and when this lever is pivoted in a counterclockwise direction it engages the collar 29 and moves it to the left, causing the annular member 32 to engage the levers 25 and pivot them clockwise so as to cause disengagement of the clutch mechanism 19. A manually operable clutch pedal (not shown) is secured to and pivotal with the shaft 35 so that upon depression of the clutch pedal the clutch 19 is disengaged. When the clutch pedal is released the levers 25 are free to return to their normal positions and the springs 24 urge the pressure plate 22 to the left to cause engagement of the clutch 19.

Whenever the clutch mechanism 19 is engaged, a reduced drive power train is completed to the power take-off shaft 12. The shaft 18 has a gear 36 keyed thereto and this gear meshes with a larger gear 37 that comprises part of a spool 38. This spool 38 also includes a relatively smaller gear 39 which meshes with a large gear 40 that comprises a portion of a second spool 41. The spool 41 also includes a small gear 42 that meshes with a gear 43 splined to the power take-off shaft 12. The spool 41 is rotatably mounted upon a stationary shaft 44 and the spool 38 is rotatably mounted upon a stationary shaft 45, both of these shafts being rigidly secured to an intermediate casing 46 secured to the support plate 16 by means of bolts 47.

A second intermediate shaft 48 is journaled in the intermediate casing 46 by means of roller bearings 49 and is piloted and journaled in the intermediate shaft 18 by means of needle bearings 50. A friction clutch 51 is provided for interconnecting the two intermediate shafts 18 and 48 and includes a first annular drum 52 formed integrally with the gear 36 and a second annular drum 53 splined to the intermediate shaft 48. With respect to the clutch 51, the shaft 18 comprises a drive shaft or power input shaft for driving the clutch. An annular pressure ring 54 is splined and keyed to the drum 52. A plurality of friction discs 55 are keyed to the drum 52 and a plurality of friction discs 56 are keyed to the drum 53. An annular piston 57, sealingly connected to the drum 52 and to the shaft 18 is reciprocable longitudinally to compress the friction discs 56 and 55 against the pressure ring 54 to cause engagement of the clutch 51. A compression spring 58, which abuts an annular ring 58a keyed to the intermediate shaft 18, also abuts the piston 57 and continuously biases it in a direction to cause disengagement of the clutch 51. Engagement of the clutch 51 is obtained when fluid under pressure is admitted behind the piston 57 and overcomes the effect of the spring 58.

The transmission mechanism 11 includes a driven shaft 59 rotatably mounted in the support plate 17 by means of antifriction bearings 60 and piloted in the intermediate shaft 48 by means of antifriction bearings 61. Also included in the transmission mechanism 11 is a countershaft 62 which is rotatably mounted in the support plates 16 and 17 by means of antifriction bearings 63 and 64 respectively and which is concentrically mounted around the power take-off shaft 12. The countershaft 62 has a pair of gears 65 and 66 integrally formed thereon and has a gear 67 and one member 68 of a jaw type clutch 69 splined thereto. A gear 70 is rotatable around the member 68 and a gear 72 is rotatable on the countershaft 62. The driven shaft 59 has a pair of gears 73 and 74 splined thereto which mesh, respectively, with the gears 70 and 72. Rotatably mounted on the drive shaft 59 are a pair of gears 75 and 76 which mesh respectively with the gears 65 and 66. An axially fixed member 77 of a jaw type clutch 78 is splined to the driven shaft 59 and carries a longitudinally reciprocable collar 79 which is movable to the left to engage or mesh with teeth 80 integrally formed on the gear 75, and movable to the right to mesh with teeth 81 integrally formed on the gear 76. The jaw clutch 69 includes a reciprocable collar 82 which is movable to the left into mesh with teeth 83 integrally formed on the gear 70, and to the right into mesh with teeth 84 integrally formed on the gear 72.

The transmission mechanism 11 also includes means for completing a reverse drive to the driven shaft 59 which includes a second countershaft 85 rotatably mounted around a stationary shaft 86 which itself is carried by the support member 17 and by a short supporting member 87. The countershaft 85 has a gear 88 integrally formed therewith which meshes with the gear 74 splined to the driven shaft 59 and a rotatable gear 89 meshes with the gear 65 on the countershaft 62. Splined to the countershaft 85 is a reciprocable jaw clutch collar 90 that is formed with internal teeth 91 that are movable into meshing engagement with external teeth 92 integrally formed on the gear 89. Shift forks 93, 94 and 95 are respectively provided for shifting the jaw clutch collars 79, 82 and 90.

The intermediate shaft 48 is provided with a gear 96 which meshes with the gear 67 in order to transmit rotary motion from the intermediate shaft 48 to the transmission mechanism 11. The transmission mechanism 11 provides four forward speed drives and a single reverse drive between the intermediate shaft 48 and the driven shaft 59 and each of these different drives may be completed by engaging one of the jaw clutches 78, 69 or 90. When all three of the jaw clutches occupy their disengaged position the transmission is in neutral and the gear 96 and countershaft 62 merely idle.

Low or first forward speed drive may be established through the transmission mechanism 11 by moving the clutch collar 79 to the right into meshing engagement with the teeth 81. At this time a power train is completed to the driven shaft 59 which extends from the gear 96 through the gear 67, through the countershaft 62, through the gears 66 and 76, through the clutch 78 to the driven shaft 59. Second forward speed drive through the transmission 11 may be established by moving the clutch collar 82 into meshing engagement with the teeth 84 and this drive proceeds from the gear 96 through the gear 67, through the countershaft 62, through the clutch 69, through the gears 72 and 74 to the driven shaft 59. Third forward speed drive through the transmission 11 may be established by moving the clutch collar 79 into meshing engagement with the teeth 80 and under this condition the drive extends from the gear 96 through the gear 67, through the countershaft 62, through the gears 65 and 75, and through the clutch 78 to the driven shaft 59. Fourth or high forward speed drive through the transmission 11 may be established by moving the clutch collar 82 into meshing engagement with the teeth 83 and this drive extends from the gear 96 through the gear 67, through the clutch 69, through the gears 70 and 73 to the driven shaft 59. Reverse drive through the transmission 11 may be established by moving the clutch collar 90 until its teeth 91 mesh with the teeth 92, with the other clutches 69 and 78 occupying their disengaged positions. The reverse power train then proceeds from the gear 96 through the gear 67, through the countershaft 62, through the gears 65 and 89, through the teeth 92 and 91, through the collar 90 and countershaft 85, through the gears 88 and 74 to the driven shaft 59.

The means for supplying and controlling the fluid pressure for actuating the clutch 51 will now be described. The fluid pressure is supplied by means of a pump 97, of conventional construction, that is driven by means of a gear 98 that meshes with the gear 36 splined to the intermediate shaft 18. The pump 97 draws its supply of oil or fluid through an inlet conduit 99 which extends into the lower portion of the casing 46. A suitable supply of oil for lubricating the gearing and for supplying the pump 97 is maintained in the lower portion of the casing 46. The pump 97 supplies oil under pressure to a conduit 100 formed in a sleeve 101 that is seated within a bore 102, formed in the casing 46 and threaded into the pump 97 as indicated at 103.

The sleeve 101 is also bored as at 104 and receives a reciprocable valve 105 therein. The valve 105 and sleeve 101 are disclosed in detail in the aforementioned copending application of J. A. Lauck, Serial No. 212,910. The sleeve 101 is formed with peripheral grooves 106, 107 and 108, the groove 106 communicating with a conduit 109 and each of the grooves 107 and 108 communicating with a bleed conduit 110 which drains into the casing 46. The peripheral groove 106 communicates with the conduit 100 through a plurality of radially extending apertures 111. The peripheral grooves 107 and 108 also communicate with the interior of the sleeve 101 through radially extending apertures 112 and 113 respectively.

The valve 105 has an enlarged end portion which is internally bored as at 114 and when the valve 105 occupies one of its rotative positions the internal bore 114 communicates with the radially extending apertures 112 by means of radially extending apertures 115 formed in the valve 105. A block 116 is keyed within the sleeve 101 and a compression spring 117 seated against this block abuts a washer 118 and continuously urges the valve 105 into the position shown in Fig. 1. The valve 105 is both rotatable slightly and reciprocable slightly. In one of the rotative positions of the valve 105, the radially extending apertures 115 do not register with the apertures 112 and in this position, the fluid pressure supplied by the pump 97 increases so as to move the valve bodily to the left. Eventually there is a direct communication between the conduit 100 and the bleed conduit 110. In the other rotatable position of the valve 105 the apertures 115 register with the apertures 112 and at this time the fluid is drained off through the bleed conduit 110 as fast as it is supplied by the pump 97.

Manual means are provided for moving the valve to either of its rotative positions and to this end a lever 119 is keyed to the valve 105 and held in place by means of a nut 120. A Bowden wire connection extends from the lever 119 into a position easily reached by the operator of the tractor so that the rotative position of the valve 105 may be manually controlled.

When the valve 105 occupies the position wherein the radially extending apertures 115 are out of alignment with the apertures 112, and the intermediate shaft 18 is rotating and driving the pump 97, the pump produces a fluid pressure which is supplied through the conduit 100, through the radially extending apertures 111, through the peripheral groove 106, through the conduit 109, through a peripheral groove 121 formed in the intermediate shaft 18, through a plurality of radially extending apertures 122 formed in the intermediate shaft 18, through an axially extending conduit 123 formed in the intermediate shaft 18, through a plurality of radially extending apertures 124 in the shaft 18 and into the cylinder formed by the shaft 18 and the annular drum element 52 behind the piston 57. When the pressure of the fluid behind the piston 57 increases sufficiently to overcome the effect of the spring 58 the piston 57 moves to the right and compresses the friction plates 56 and 55 against the pressure ring 54 to cause engagement of the clutch 51. As the speed of rotation of the intermediate shaft 18 increases the pressure of the fluid supplied by the pump 97 likewise increases and upon increasing to a predetermined value, it moves the valve 105 to the left until the apertures 112 are exposed whereupon some of the fluid will be drained through the bleed conduit 110. Then as the pressure of the fluid is decreased due to this draining off of part of it the compression spring 117 functions to return the valve 105 again to the right to again close the apertures 112. Thus the valve 105 acts as a pressure relief valve to effect a draining of the fluid supplied by the pump 97 when the pressure thereof increases above a predetermined value. When the valve 105 is rotated to the position wherein the apertures 112 and 115 are in alignment there is a continuous bleed path for the conduit 100 and therefore the fluid pressure cannot increase sufficiently to overcome the spring 58 and thereby effect engagement of the clutch 51. As is apparent, the apertures 113 and peripheral groove 108, which are in continuous communication with the bleed conduit 110 function to permit easy reciprocation of the valve 105 by eliminating any hydraulic lock.

A shaft 125 is longitudinally aligned with the power take-off shaft 12 and extends to the rear of the tractor in order to transfer the rotation of the power take-off shaft 12 to an implement being pulled by the tractor and driven by the power take-off shaft 12. As is obvious, it is undesirable to have a power driven rotating shaft exposed at the rear of the tractor except when such shaft is being utilized to drive an element being towed by the tractor. Therefore a manually operable jaw type clutch 126 is provided between the shafts 12 and 125 for controlling the rotation of the rearwardly extending shaft 125. The jaw type clutch 126 comprises a gear or toothed element 127 splined and keyed to the power take-off shaft 12, and a reciprocable collar 128, splined to the shaft 125 and reciprocable with respect thereto. The collar 128 has internal jaw clutch teeth 129 reciprocable into meshing engagement with the toothed element 127. The collar 128 is formed with a peripheral groove 130 and a shift fork 131 seated within this groove is reciprocable to cause engagement and disengagement of the clutch 126. The shift fork 131 is operated by a shift rail 132 slidably mounted in an aperture 133 formed in a stationary member 134. The shift fork 131 is held rigid with respect to the shift rail 132 by means of a nut 135 and detent means are provided for yieldably retaining the rail 132 in either its clutch engaging or clutch disengaging position. The detent means comprises two peripheral grooves 136 and 137, both of which serve to retain the shift rail in either its clutch engaging or clutch disengaging position when a ball 138 reciprocably mounted within an aperture 139 is urged into either groove by means of a compression spring 140. Thus, when the ball 138 is seated within the groove 136 the clutch 126 occupies its disengaged position and when the shift rail 132 is moved to the left to cause the ball 138 to become seated in the groove 137 the clutch 126 occupies its engaged condition. When the clutch 126 is engaged the rotation of the shaft 12 is transmitted through the shaft 125 to the rear end of the tractor and when the clutch 126 is disengaged the shaft 125 is stationary so that there is no power driven rotating shaft extending from the rear of the tractor.

In the operation of the tractor with which the present invention is associated, depression of the conventional manually operated clutch pedal causes disengagement of the main clutch 19 and at this time all of the gears and shafts of the transmission mechanism 11 and the power take-off shaft 12 are stationary. When the main clutch pedal is released to cause engagement of the main clutch 19 a power train is immediately established to the power take-off shaft 12 and if the positive clutch 126 is engaged this power train also extends to the shaft 125. However, if the clutch 126 is disengaged the power take-off shaft 12 merely idles at this time. Therefore the clutch 126 provides a means for completing a power train to an implement being driven by the tractor. When the tractor engine is idling with the clutch 19 engaged the intermediate shaft 18 rotates at a relatively slow speed and under this condition the pump 97 momentarily will not supply the necessary fluid pressure to overcome the effect of the compression spring 58 but, as the fluid pressure builds up it will effect engagement of the clutch 51. When the clutch 51 is engaged, the intermediate shaft 48 and the transmission mechanism 11 will be effective to transmit power. The transmission mechanism 11 is thus driven at this time and if one of the clutches 90, 69 or 78 occupies one of its engaged positions the corresponding power train will be completed to the driving wheels of the tractor. The engagement of the clutch 51, though very rapid after the speed of the intermediate shaft 18 is increased due to the throttle depression, is nevertheless a smooth engagement because of the fact that the pump 97 must build up sufficient fluid pressure to cause engagement of the clutch 51. It is therefore apparent that the tractor starts from rest smoothly and without a jerk which normally occurs when the main clutch operating pedal is released, as the release of the main clutch pedal and engagement of the clutch 19 does not of itself complete the drive to the driven wheels of the tractor, it being necessary that the clutch 51 also be engaged.

The feature disclosed by the present invention which permits the manual disengagement of the clutch 51 even though the intermediate shaft 18 is being driven at a relatively high rate of speed renders the present invention particularly useful in farm tractors. As is quite well-known, when a farm implement such as a corn picker is being used it often happens that the implement will become plugged for one reason or another and at such time it is desirable to be able to drive the implement while it is not moving forward. In the case of a corn picker it often happens that, if the supply of corn to the picker can be stopped for a few moments and the picker merely driven, it will clean itself out. But if it is not possible to so drive the picker except when it is being moved forward, the supply of corn thereto cannot be stopped and therefore to alleviate the plugged condition it is necessary to stop the tractor and the picker and manually pull out the over-supply of corn or otherwise manually correct the trouble.

By mounting the power take-off shaft within the customary countershaft it is apparent that the present invention provides a power take-off device for use with farm tractors which requires little or no more space in the transmission casing than that which is normally not utilized. Thus, design changes in the customary tractor transmission are held at a minimum and the cost of the power take-off mechanism and consequent design changes of the transmission mechanism are very low.

It is contemplated that numerous changes and modifications may be made in the present invention without departing from the spirit or scope thereof.

We claim:

1. In a transmission assembly, the combination of a drive shaft, a first intermediate shaft, a first clutch between said drive shaft and said first intermediate shaft, a second intermediate shaft, a second clutch between said two intermediate shafts, a countershaft, gearing interconnecting said countershaft and said second intermediate shaft, a power take-off shaft mounted concentrically with said countershaft, and gearing continuously interconnecting said first intermediate shaft and said power take-off shaft, said first clutch when engaged completing a drive at all times to said power take-off shaft and said second clutch when engaged being effective to complete a drive to said countershaft only during the engagement of said first clutch.

2. In a transmission assembly, the combination of a drive shaft, a first intermediate shaft, a first clutch between said drive shaft and said first intermediate shaft, a second intermediate shaft, a second clutch between said two intermediate shafts, a countershaft, gearing interconnecting said countershaft and said second intermediate shaft, a power take-off shaft mounted concentrically with said countershaft, and gearing continuously interconnecting said first intermediate shaft and said power take-off shaft, said first clutch when engaged completing a drive at all times to said first intermediate shaft and to said power take-off shaft, manually operable control means, and means driven by said first intermediate shaft during engagement of said first clutch and effective upon the operation of said control means for effecting a gradual engagement of said second clutch to thereby gradually complete a drive to said countershaft.

3. In a tractor transmission, the combination of a power input shaft, a driven shaft for driving the driving wheels of the tractor, an intermediate shaft, a friction clutch having one element driven by said drive shaft and having another element connected with said intermediate shaft, means driven by said drive shaft for effecting an engagement of said clutch, gearing for selectively completing a plurality of drives to said driven shaft when said clutch is engaged, a power take-off shaft concentrically mounted with respect to a portion of said gearing, means for completing a drive between said drive shaft and said power take-off shaft, a shaft extending rearwardly of the tractor and connectible with an implement being towed by the tractor for driving the implement, and a clutch between said rearwardly extending shaft and said power take-off shaft engageable to complete a drive from said drive shaft to the implement to drive the implement.

4. In a tractor transmission, the combination of a drive shaft, a driven shaft for driving the driving wheels of the tractor, an intermediate shaft, a friction clutch having one element driven by said intermediate shaft, means driven by said intermediate shaft for effecting an engagement of said clutch, gearing for selectively completing a plurality of drives to said driven shaft when said clutch is engaged, a power take-off shaft concentrically mounted with respect to a portion of said gearing, means providing a drive between said intermediate shaft and said power take-off shaft, a shaft extending rearwardly of the tractor and connectible with an implement being towed by the tractor for driving the implement, a clutch between said rearwardly extending shaft and said power take-off shaft engageable to complete a drive from said intermediate shaft to the implement to drive the implement, and a main clutch between said drive shaft and said intermediate shaft manually disengageable to stop rotation of both said driven and said rearwardly extending shafts.

References Cited in the file of this patent

UNITED STATES PATENTS

| 1,579,540 | Jackson | Apr. 6, 1926 |
| 1,938,914 | Kress | Dec. 2, 1933 |
| 2,153,372 | Hyde | Apr. 4, 1939 |
| 2,210,998 | Baker et al. | Aug. 13, 1940 |
| 2,238,841 | Allgeyer | Apr. 15, 1941 |
| 2,311,265 | Stumpf | Feb. 16, 1943 |
| 2,334,958 | Rohkar | Nov. 23, 1943 |
| 2,349,880 | Orelind | May 30, 1944 |
| 2,488,540 | Hollingsworth | Nov. 23, 1949 |
| 2,489,699 | Clark | Nov. 29, 1949 |
| 2,537,060 | Keese | Jan. 9, 1951 |